Figure 1:
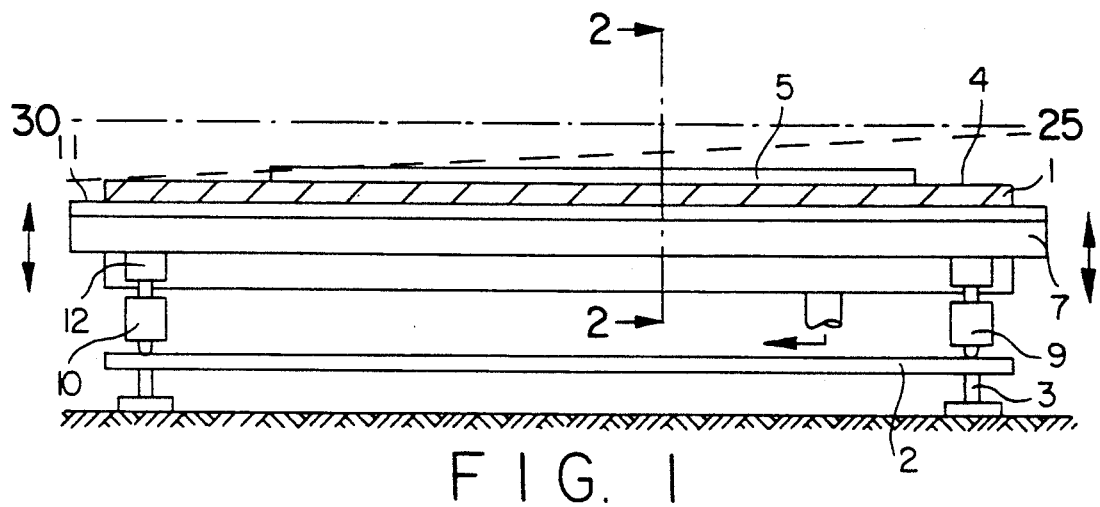

United States Patent [19]

Lisec

[11] Patent Number: 5,165,585
[45] Date of Patent: Nov. 24, 1992

[54] METHOD AND APPARATUS FOR BREAKING GLASS SHEETS

[76] Inventor: Peter Lisec, Bahnhofstrasse 34, A-3363 Amstetten-Hausmening, Austria

[21] Appl. No.: 698,907

[22] Filed: May 13, 1991

[30] Foreign Application Priority Data

May 15, 1990 [AT] Austria ................... 1079/90

[51] Int. Cl.⁵ ................ C03B 33/033; B26F 3/00
[52] U.S. Cl. ........................... 225/2; 225/93; 225/96.5; 225/105
[58] Field of Search ............... 225/2, 4, 5, 94, 96.5, 225/103, 104, 93, 105, 106

[56] References Cited

U.S. PATENT DOCUMENTS

| | | | |
|---|---|---|---|
| 1,792,653 | 2/1931 | Moxley | 225/103 |
| 1,920,641 | 8/1933 | Heichert | 225/2 |
| 3,253,756 | 5/1966 | Haley et al. | 225/2 |
| 3,372,847 | 3/1968 | Walters et al. | 225/96.5 X |
| 3,567,086 | 3/1971 | Wark et al. | 225/96.5 X |
| 3,570,734 | 3/1971 | Allen | 225/104 |
| 3,592,370 | 7/1971 | Boardman | 225/96.5 X |
| 3,668,955 | 6/1972 | Rupprecht et al. | 225/96.5 X |
| 3,693,852 | 9/1972 | Simomura | 225/4 |
| 3,743,149 | 7/1973 | Groppe | 225/2 |
| 3,913,812 | 10/1975 | Augustin et al. | 225/2 |
| 4,072,259 | 2/1978 | Welton | 225/96.5 X |
| 4,948,025 | 8/1990 | Lisec | 225/104 |

FOREIGN PATENT DOCUMENTS

| | | |
|---|---|---|
| 0340199 | 11/1989 | European Pat. Off. |
| 801215 | 12/1950 | Fed. Rep. of Germany |
| 1957601 | 6/1970 | Fed. Rep. of Germany |
| 2925981 | 1/1980 | Fed. Rep. of Germany |
| 3428863 | 2/1986 | Fed. Rep. of Germany |
| 1314389 | 7/1961 | France ............... 225/96.5 |

Primary Examiner—Frank T. Yost
Assistant Examiner—Clark F. Dexter
Attorney, Agent, or Firm—Young & Thompson

[57] ABSTRACT

The method relates to breaking glass sheets (5) with a line scored on one side, the glass sheet (5) being first raised at one end of the scored line and thereupon, in the remaining areas, it is progressively raised beginning with the initially lifted end. To carry out this breaking method, a breaking table (1) is provided of which the lifting strip (7) or roller can be raised on one side (I) first and then gradually lifted into the position II parallel to the table support surface (4). The glass sheet (5) is depressed on both sides of the lifting strip (7) or roller by suction heads (20) under partial vacuum or by boreholes (13) communicating with a source of partial vacuum.

8 Claims, 1 Drawing Sheet

METHOD AND APPARATUS FOR BREAKING GLASS SHEETS

The invention concerns a method for breaking glass sheets along a scored line in the glass sheet, wherein the glass sheet is initially lifted in the vicinity of the scored line at one end of the scored line and is depressed on both sides of the line for the purpose of bending it, so that the scored line is on the convex side of the flexure thus produced in the glass sheet.

Such methods are known from German Offenlegungsschriften 29 25 981 and 34 28 863; from European patent document A 340 199; and from U.S. Pat. Nos. 3,253,756; 3,372,847; 3,570,734; 3,668,955 and 3,693,852.

In all known procedures and apparatus for breaking scored glass sheets, the lifting strip or roller is raised in such manner that it simultaneously and uniformly raises the glass sheet near the score line. Not only are substantial forces required thereby when breaking glass sheets of substantial thickness, but also considerable force is required when depressing the glass sheets on both sides of the lifting strip or roller. Lastly it was found that the known procedures and apparatus do not always assure clean rupture edges.

German patent 801 215 discloses apparatus for removing edge-strips from glass sheets. In this known apparatus, the glass sheets are moved over a rest projecting beyond the table supporting the glass sheets and in the form of a roller. The convexity of the glass sheets is achieved exclusively by the their own weight bending them on both sides downward, that is toward the table.

German Offenlegungsschrift 19 57 601 describes apparatus for dividing glass sheets comprising a lifting strip, possibly in the form of a roller, underneath the glass sheet. The lifting strip can be raised from one side, with two depressing studs engaging the glass sheet from above in the vicinity of the lifting end of the lifting strip, these two studs being liftable jointly with the lifting strip and curving the glass sheet.

The object of the invention is to create a method of the initially cited kind whereby glass sheets can be broken in problem-free manner even along quite long lines, in particular the so-called traverse lines (score lines across the entire width of the glass).

The invention achieves this object by continuously and transversely curving the glass sheet along the score line and by depressing it on both sides and in the vicinity of the scratch line by applying a partial vacuum to its lower side.

In the method of the invention, the glass sheet first is lifted at one edge, and this lifting motion is gradually continued until the glass has been raised in the vicinity of the entire score line. The rupture process is initiated much more easily and much more rapidly by beginning lifting on one side and as a result less force is required and cleaner lines of rupture than heretofore are achieved. Because in the method of the invention the glass sheet is kept down on both sides of the lifting strip or lifting roller by the application of vacuum, depressing means acting from above can be eliminated. This makes it possible when resorting to the invention to apply the vacuum at discrete spots, for instance by means of suction cups, or by applying the vacuum along continuous zones on both sides of the score line.

As a rule the method of the invention is carried out in such manner that while the glass sheet indeed is lifted at one edge to start with, at the end of the lifting however this glass sheet shall have been raised uniformly above the rest surface over the entire length of the score line.

In one embodiment of the invention, an apparatus with which to implement the method of the invention comprises a table and a lifting strip or roller mounted in a gap in the table and raised when needed above the table support surface—where this table preferably is an air-cushion table or a table with conveyor belts to move the glass sheet—is characterized in that the lifting strip or lifting roller is connected to its lifting system in a vertical plane passing through the score line and oblique where called for, and in that the lifting system comprises a drive which is actuated at one end of the lifting strip or roller earlier than the lifting drive at the other end of the lifting strip or roller, both lifting drives carrying out an equal stroke. This embodiment furthermore may include that the lifting drives at the ends of the lifting strip or roller are phase-shifted in time when rising to the same elevation above the support surface.

Another embodiment of the apparatus of the invention with which to carry out the method comprises a table and a lifting strip or lifting roller mounted in a gap in this table which can be raised above the support surface of this table, where this table preferably is in the form of an air-cushion table or a table with conveyor belts to move the glass sheet, is characterized in that the edge of the lifting strip acting on the glass sheet, or the edge of the shaft of the lifting roller, is oblique to the table support surface.

In the former embodiment, the lifting strip or roller, when in its rest position—wherein it is present below the support surface of the table—is essentially parallel to this rest surface and initially is raised on one side by the lifting drive and thereupon, where called for before one end has reached its upper final position, is also raised on the other side.

In the other embodiment of the apparatus of the invention, the operative edge of the lifting strip is held obliquely to the table support surface whereby the lifting strip initially engages the glass sheet at one side and then raises it unilaterally. Similar considerations appropriately hold for the embodiment with a lifting roller of which the axis is oblique to the table support surface.

In both embodiments the lifting strip or roller can be raised by a conventional drive. Obviously the lifting drives associated with the two ends of the lever strip or roller may be independent, whereby the lifting strip or roller when at last in its end position will be parallel with its operative edge or shaft to the support surface.

In both embodiments the lifting strip or roller can be raised by a conventional drive. Obviously the lifting drives associated with the two ends of the lifting strip or roller may be independent, whereby the lifting strip or roller when at last in its end position will have its operative edge or shaft parallel to the support surface.

The depression of the glass sheet when being broken by the method of the invention preferably is carried out resorting to vacuum applied from below to the glass sheet because it is simplest thereby to take into account the differing raising of the glass sheet (the raising proceeds from one end of the score line to the other). Practically a number of ways are available, one being characterized in that the rest surface comprises boreholes on both sides of the lifting strip or roller which communicate with a source of vacuum and extend across the surface of the table. The alternative is characterized in that at least two suction heads are present on both sides of the lifting roller or strip, the edges of these suction heads being in or below the table support surface when in their initial position.

Figure 2:
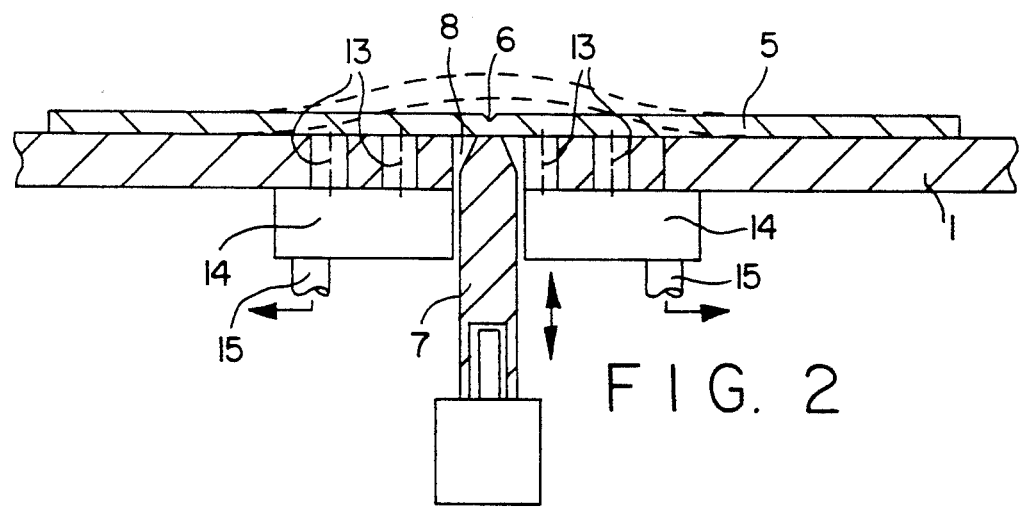
Figure 3:
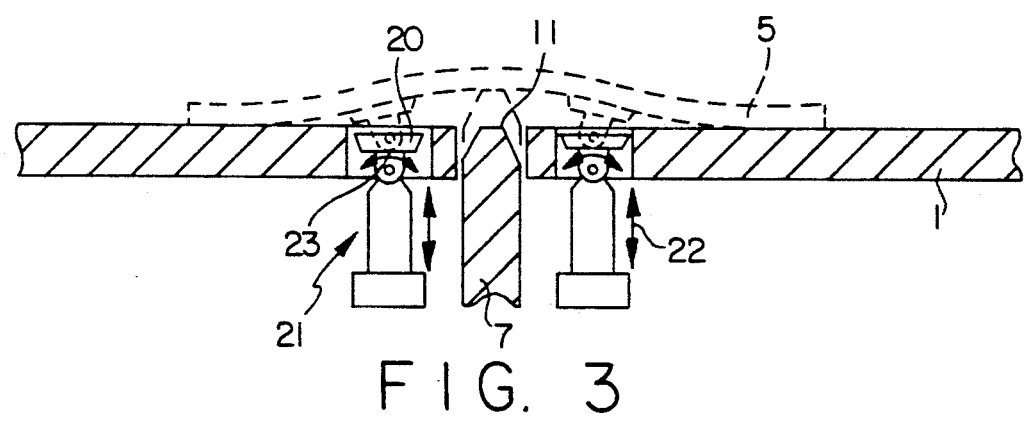

Further features and details of the invention are discussed below in relation to the attached drawing, wherein:

FIG. 1 is an elevational view of apparatus for breaking glass, shown in cross-section, FIG. 2 is a section of the apparatus of FIG. 1 along line 2—2 of FIG. 1, and FIG. 3 is a modified embodiment shown in section as in FIG. 2.

The table shown 1 in FIG. 1 comprises a frame 2 and stands on the floor by means of feet 3. The support surface 4 of the table 1 serves to support a glass sheet 5 which is to be divided. For that purpose the table 1 may be of known design as illustratively shown in the documents cited in the introduction.

An elongated lifting member comprising a lifting strip 7 is present within a gap 8 in the table 1 and can be raised and lowered (in lieu of the lifting strip 7, a lifting roller also may be provided, which if desired can be rotatable or rotatably driven, in particular when the breaking is to be carried out dynamically—see for instance European patent document A 0 340 199).

The glass sheet 5 is moved into such a position that a scored line 6 (shown enlarged in FIG. 2) present on its top side is located above the lifting strip 7. To carry out the breaking, the lifting strip 7 first is raised by lifting drives comprising lifting cylinders 9 and 10 so that the cylinder 9 on the right in FIG. 1 raises the lifting strip 7 until its upper edge 11 assumes the position denoted by 25 and shown by dashes in FIG. 1. As a result, the glass sheet 5 is raised on one side and breaking is initiated. While the lifting strip 7 is being moved upward by the lifting cylinder 9—or upon termination of the lifting by the cylinder 9—the lifting cylinder 10 is actuated and raises the lifting strip 7 until finally it assumes the end position denoted by dots and dashes and referenced 30 in FIG. 1.

As diagrammatically shown in FIG. 1, the lifting strip 7 is connected in an articulated manner at 12 to the lifting cylinders 9 and 10.

In order to depress the glass sheet 5 during breaking, boreholes 13 are present in the embodiment of FIG. 2 in the table 1 on both sides of the gap 8 holding the lifting strip 7 in the table 1 and can be used to apply a vacuum by means of a suction box 14 and conduit 15.

Alternatively to the vacuum boreholes 13, the table 1 may comprise several suction heads 20 connected with a vacuum, as shown in FIG. 3, and hinging on their lifting devices 21, whereby these can be moved not only in the direction of the arrows 22 but also can be pivoted in the direction of the double arrow 23 about an axis parallel to the length of the lifting strip 7. As shown by dashed lines in FIG. 3, the suction heads 20 therefore can be slanted during breaking and thereby can adhere so securely to the lower side of the glass sheet 5 that this sheet will be pulled down by the corresponding force.

In an embodiment not shown herein, the lifting strip 7 alternatively to the embodiment of FIG. 1 may comprise an operative edge (upper edge 11 of lifting strip 7) which is disposed at a slant to the support surface 4 of the table 1, whereby this operative edge need only be uniformly raised without tilting to start raising the glass sheet 5 in the vicinity of the score line 6 at one of its ends.

Where desired, the lifting strip may be raised further by means of an upper edge oblique to the support surface 4 at the lower side of the upper edge, whereby the upper edge will again be aligned parallel to the table 1 at the end of cutting. Appropriately this also applies to a lifting roller of which the axis of rotation can be directed obliquely to the surface 4 of the table 1.

What is claimed is:

1. A method for breaking a glass sheet along a line scored in the glass sheet, said line having two ends, comprising applying to an underside of a glass sheet an elongated solid member having two ends and in vertical registry with said score line, raising one end of said elongated solid member to an elevation higher than the other end of said member thereby raising the glass sheet near one said end of the scored line to an elevation higher than the elevation of the glass sheet near the other end of the scored line, and depressing the glass sheet on both sides of the scored line to produce flexure in the glass sheet about said solid member, the scored line being located on a convex side of said flexure, said depressing being achieved by applying a vacuum to the lower side of the glass sheet, thereby progressively convexly curving the glass sheet transversely and along the scored line and depressing the glass sheet near the scored line and on both sides of the scored line so as to initiate breaking of the glass sheet along the scored line beginning at said one end of the scored line.

2. Apparatus for breaking glass sheets along lines scored in the glass sheets, comprising a table (1) and an elongated lifting member (7) mounted in a gap (8) in the table, the table having a support surface (4) above which said lifting member (7) can be raised, the lifting member (7) being connected with lifting drives (9, 10) disposed adjacent opposite ends of the lifting member (7) in a vertical plane passing through the gap (8), the lifting drives (9, 10) being individually operable so as to permit raising one said end of the elongated lifting member (7) earlier than the other said end of the elongated lifting member (7), and boreholes (13) communicating with a source of vacuum and opening at the top side of the table (1) on both sides of the lifting member (7) in the support surface (4).

3. Apparatus as claimed in claim 2, wherein the boreholes (13) open into a suction box (14).

4. Apparatus for breaking glass sheets along lines scored in the glass sheets, comprising a table (1) having a support surface (4) and an elongated lifting member (7) mounted in a gap (8) in the table (1) and means to raise the lifting member above said support surface (4), the lifting member (7) having an upper edge engaging and lifting the glass sheet (5) to attain an acute angle with the support surface (4) of the table (1), the boreholes (13) communicating with a source of vacuum and opening through said support surface (4) on opposite sides of the lifting member (7).

5. Apparatus as claimed in claim 4, wherein the boreholes (13) open into a suction ox (14).

6. Apparatus for breaking glass sheets along lines scored in the glass sheets, comprising a table (1) and an elongated lifting member (7) having tub ends and mounted in a gap (8) in the table, the table having a support surface (4) above which said lifting member (7) can be raised, the lifting member (7) being connected with lifting drives (9, 10) disposed adjacent opposite ends of the lifting member (7) in a vertical plane passing through gap, the lifting drives (9, 10) being individually operable so as to permit raising one said end of the elongated lifting member (7) earlier than the other end of the elongated lifting member (7), and at least two vertically movable suction heads (20) disposed on opposite sides of the lifting member (7).

7. Apparatus for breaking glass sheets along lines scored in the glass sheets, comprising a table (1) and an elongated lifting member (7) mounted in a gap (8) in the table (1) and means to raise the elongated lifting member, the table having a support surface above which the lifting member (7) can be raised with an upper edge of the lifting member (7) engaging and lifting the glass sheet (5) to attain an acute angle with the support surface (4) of the table (1), and at least two suction heads (20) on opposite sides of the lifting member (7).

8. Apparatus as claimed in claim 7, further comprising means for raising and lowering the suction heads (20).

* * * * *